(12) United States Patent
Noguchi et al.

(10) Patent No.: US 6,808,663 B2
(45) Date of Patent: Oct. 26, 2004

(54) METHOD OF MANUFACTURING CERAMIC STRUCTURE

(75) Inventors: Yasushi Noguchi, Nagoya (JP); Hideaki Nishi, Toyoake (JP); Hiroyuki Suenobu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/257,649
(22) PCT Filed: Feb. 22, 2002
(86) PCT No.: PCT/JP02/01587
§ 371 (c)(1),
(2), (4) Date: Oct. 16, 2002
(87) PCT Pub. No.: WO02/070434
PCT Pub. Date: Sep. 12, 2002

(65) Prior Publication Data
US 2003/0137071 A1 Jul. 24, 2003

(30) Foreign Application Priority Data

Mar. 1, 2001 (JP) .......................................... 2001-057111
Jan. 22, 2002 (JP) ......................................... 2002-012774

(51) Int. Cl.[7] .............................................. B29C 65/00
(52) U.S. Cl. ............................ 264/44; 264/628; 264/630
(58) Field of Search ............................ 264/628, 42, 43, 264/44, 630

(56) References Cited

FOREIGN PATENT DOCUMENTS

| JP | A 1-219076 | 9/1989 |
|----|------------|--------|
| JP | A 7-163822 | 6/1995 |
| JP | A 9-71482  | 3/1997 |
| JP | A 9-77573  | 3/1997 |

OTHER PUBLICATIONS

12th Edition Materials Handbook, Brady et al., McGraw Hill Book Company, Copyright 1986, pp. 329–331.*

* cited by examiner

Primary Examiner—Christopher A. Fiorilla
(74) Attorney, Agent, or Firm—Oliff & Berridge, PLC

(57) ABSTRACT

There is a method of manufacturing a ceramic structure in which a ceramics raw material, a prefoamed resin foam, and a forming aid if needed are mixed together to prepare a mixture, then the mixture is formed into a formed body, and subsequently the formed body is fired to obtain a porous ceramic structure. According to the manufacturing method, a ceramic structure having a high porosity can be obtained, without using a large amount of flammable powder.

10 Claims, 1 Drawing Sheet

US 6,808,663 B2

METHOD OF MANUFACTURING CERAMIC STRUCTURE

This application is a 371 of PCT/JP02/01587 filed Feb. 22, 2002.

TECHNICAL FIELD

The present invention relates to a method of manufacturing a porous ceramic structure and, in particular, to a method of manufacturing a ceramic structure in which a ceramic structure having a high porosity can be obtained by mixing a prefoamed resin foam in a ceramics raw material without using a large amount of flammable powder.

BACKGROUND ART

Conventionally, there has been known a method of manufacturing a porous ceramic structure in which flammable powders of carbon, wheat flour, resins, and the like are mixed with a ceramics raw material, and the mixture is formed into a formed body which is then fired while the flammable powder material is burned out. According to this manufacturing method, however, there has been a problem that cracking occurs during firing when a large amount of flammable powder is mixed in a ceramics raw material.

In Japanese Patent Laid-Open No. 9-77573, there is described a method of manufacturing a porous cordierite honeycomb structure in which there is used an organic foaming agent capable of foaming at 100° C. or below. According to this method, however, there have been problems that heating is needed for the organic foaming agent to foam, that a formed body is deformed when the organic foaming agent foams, that no pores are formed when such a high viscosity material as allowing extrusion is used, and the like.

Accordingly, the present invention has been developed in view of the above described known problems, and an object of the present invention is to provide a method of manufacturing a porous ceramic structure in which a ceramic structure having a high porosity can be obtained without using a large amount of flammable powder.

DISCLOSURE OF THE INVENTION

That is, according to the present invention, there is provided a method of manufacturing a ceramic structure, characterized by mixing a ceramics raw material, a prefoamed resin foam, and a forming aid if needed to prepare a mixture, and forming the mixture into a formed body, and then firing the formed body to obtain a porous ceramic structure.

In addition, according to the present invention, there is also provided a method of manufacturing a ceramic structure, characterized by mixing a ceramics raw material, a prefoamed resin foam, and a plasticizer to prepare a puddle, then forming the puddle into a formed body by extrusion, and subsequently firing the formed body to obtain a porous ceramic structure.

In the present invention, an obtained ceramic structure is preferably a honeycomb structure, which in particular can form a honeycomb filter, as a ceramic structure, having a plurality of through-holes provided with openings on the end surface of the exhaust gas inflow side and the end surface of the exhaust gas outflow side, the plurality of through-holes being plugged alternately on either of both end surfaces.

In addition, a ceramic structure is preferably composed of, as the main components, cordierite, silicon carbide (SiC), and/or silicon carbide (SiC) and metallic silicon (Si).

In the present invention, as for the hardness of a puddle, the puddle is preferably formed in such a way that a mass of the puddle is formed into a solid circular cylinder of 25 mm$\phi$×30 mm (length) by means of a vacuum pugmill, and the apparent Young's modulus of the cylinder as measured under a compression rate of 1 mm/s is 3.0 MPa or below, since the resin foam is not crushed so that the pores can be formed as desired. When the apparent Young's modulus is smaller than 1.5 MPa, no good formed body can be obtained owing to the increased deformation caused by its own weight during forming.

In addition, in the present invention, when a large diameter formed body is desired, a mass of puddle preferably undergoes a downward and vertical extrusion.

In the present invention, the addition amount of a resin foam is preferably 0.5 to 10 wt %, and more preferably 1 to 5 wt %. Furthermore, the average diameter of the resin foam is preferably 2 to 200 $\mu$m, and the shell wall thickness of the resin foam is preferably 0.01 to 1.0 $\mu$m.

BEST MODE FOR CARRYING OUT THE INVENTION

Figure 1:
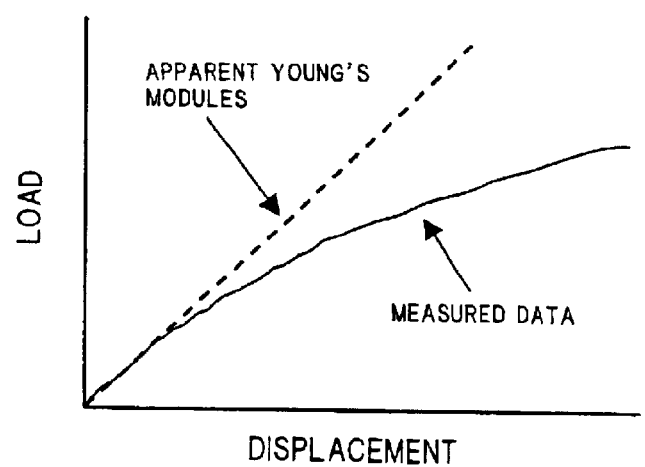
FIG. 1 is a graph showing the straight line for the apparent Young's modulus obtained from the relationship between the loads and the displacements measured by use of an autograph.

As described above, the present invention is fundamentally characterized in that a porous ceramic structure is obtained by mixing together a ceramics raw material and a prefoamed resin foam, and then forming the mixture into a formed body, and subsequently firing the formed body thus obtained.

In the present invention, contrary to the prior art where a foaming agent is mixed with a ceramics raw material, a prefoamed resin foam is mixed, so that no deformation occurs in a formed body and the prescribed pores can be formed in an extrusion formed structure without using a large amount of flammable powder.

With reference to Embodiments, more detailed description will be made below, but the present invention is not limited to these Embodiments.

In the present invention, a prefoamed resin foam is mixed in a ceramics raw material. Namely, not a foaming agent well known in the art, but a resin foam which has been already foamed (expanded) and has bubbles inside is mixed in a ceramics raw material.

In the present invention, if the hardness of a mixture formed by mixing a prefoamed resin foam in a ceramics raw material, in particular, the hardness of a puddle is larger than a prescribed value, when the mixture (the puddle) undergoes kneading, pugging, and the extruding forming or the like, the resin foam is crushed and the pores cannot be formed. Consequently, in the present invention, as for the hardness of a puddle, the puddle is preferably formed in such a way that a mass of the puddle is formed into a solid circular cylinder of 25 mm$\phi$×30 mm (length) by means of a vacuum pugmill, and the apparent Young's modulus of the cylinder as measured at a compression rate of 1 mm/s is 3.0 MPa or below, and the puddle is more preferably formed so that the apparent Young's modulus is 2.5 MPa or below. When the apparent Young's modulus is larger than 3.0 MPa, that is, the hardness of a puddle is larger than the prescribed hardness, the pressure exerting on the puddle becomes so large during kneading, pugging, and/or forming that the resin foam is crushed and the pores cannot be formed.

In addition, when the apparent Young's modulus is smaller than 1.5 MPa, that is, the hardness of a puddle is smaller than the prescribed hardness, the shape retention of the formed body is not so sufficiently high that the formed body is deformed by its own weight.

In the present invention, the addition amount of a resin foam is preferably 0.5 to 10 wt %, and more preferably 1 to 5 wt % of the total amount of the mixture (or the puddle). When the addition amount of a resin foam is smaller than 0.5 wt %, the pore forming effect is not sufficient, and when the apparent Young's modulus of a puddle is made to be 3.0 MPa or below so that the resin foam is not crushed, the shape retention is not sufficiently high so that the honeycomb formed body is deformed by its own weight while extrusion. When the addition amount of a resin foam is larger than 10 wt %, a puddle cannot be formed so that no forming is possible. As in the present invention, when the addition amount of a resin foam is 0.5 wt % or above, the formed body becomes lighter owing to the presence of the resin foam, and the deformation of the formed body caused by its own weight can be suppressed even for the apparent Young's modulus of the puddle of 3.0 MPa or below.

In addition, the average diameter of the resin foam used in the present invention falls within the range preferably from 2 to 200 µm, and more preferably from 10 to 100 µm. When the average diameter of the resin foam is smaller than 2 µm, the resin foam gets into the voids in the ceramics raw material so that its efficacy becomes smaller in the pore formation in the ceramic structure. When the average diameter of the resin foam is larger than 200 µm, the strength of the resin foam becomes weaker, and the resin foam tends to be easily crushed during kneading, pugging, and/or forming so that the efficacy becomes smaller in the pore formation.

The shell wall thickness of the resin foam falls in the range preferably from 0.01 to 1.0 µm, and more preferably from 0.1 to 0.5 µm. When the shell wall thickness is smaller than 0.01 µm, the resin foam tends to be easily crushed so that the efficacy becomes smaller in the pore formation. On the other hand, when the shell wall thickness of the resin foam is larger than 1.0 µm, the weight of the resin foam becomes heavier, and hence there occurs a problem that cracking tends to be generated when the formed body is fired.

As for the material of the resin foam used in the present invention, that is, the shell wall material of the resin foam, such a flexible material is preferable that there is induced no crushing by the pressure exerted while kneading, pugging, and/or forming; for example, the copolymer of vinylidene chloride, copolymer of acrylonitrile, and the like are preferable.

By the way, in addition to the resin foam, as pore forming materials, graphite, the resin powders of poly(ethylene terephthalate) (PET), poly(methyl methacrylate) (PMMA), and the like, and such a forming aid (binder) as methyl cellulose or the like can be added to the mixture (a puddle); in order to suppress the cracking generation during firing, the addition amounts of such organic substances as resins, binders, and the like are preferably 20 wt % or below in total.

When the ceramic structure obtained in the present invention is made to have a honeycomb structure in which a plurality of through-holes, having the openings on the end face of the exhaust gas inflow side and the end face of the exhaust gas outflow side, are sealed alternately on either of the end faces, the ceramic structure can be suitably used as an exhaust gas filter. The honeycomb filter is not limited particularly in shape, and its shape may be, for example, a cylinder having a circular or an elliptic end face, a prism having a polygonal end face such as trigon, tetragon, or the like, or an elbowed shape of one of these cylinders and prisms. In addition, there is no particular limitation in the shape of the through-hole, and its sectional shape may be such a polygon as tetragon, octagon, or the like, a circle, or an ellipse. In view of the exhaust gas pressure loss, the filter cell density is preferably 200 cells/in$^2$ or above, and more preferably falls in the range from 250 to 400 cells/in$^2$.

There is no particular limitation to the main component of the ceramic structure, but any kind of ceramics material can be used as the main component, and it is preferable to use cordierite, silicon carbide (SiC), and/or silicon carbide (SiC) and metallic silicon (Si) as main components. The cordierite may be any of the oriented, non-oriented, α crystalline, β crystalline quality, and the like. The silicon carbide may be any of the α crystalline, β crystalline quality, or the like.

In addition, the main component of the ceramic structure may include such other components as mullite, zircon, aluminum titanate, clay-bonded silicon carbide, zirconia, spinel, indialite, sapphirine, corundum, titania, and the like.

In the present invention, a resin foam is mixed into the above described ceramics raw material, and the mixture is formed. The forming method may be any of the methods well known in the art, but in order to achieve more efficient production and to increase the efficacy of the resin foam, it is preferable to form a puddle by charging the binder, resin foam, plasticizer, and water, and subsequently kneading.

Then, while the forming is made using the plastic body of ceramics, the forming can be performed by means of the extrusion method, injection forming method, press forming method, and a method forming through-holes subsequently to the forming of the ceramics raw material into a cylindrical shape. Among these methods, the extrusion method is preferable, since it allows an easy continuous forming and can provide, for example, a low thermal expansion characteristic by orienting the cordierite crystals.

As for the extrusion method, in order to suppress the deformation subsequent to the forming, a vertical extrusion is preferable in which extrusion is made downward along the vertical direction. When the formed article is small in diameter, a lateral extrusion is possible in which extrusion is made along a lateral direction, whereas when the formed article is large in diameter, a vertical extrusion is preferable in which extrusion is made downward along a vertical direction in order to suppress the deformation subsequent to the forming.

Then, drying of the formed body can be performed by means of the hot air drying, microwave drying, dielectric drying, reduced pressure drying, vacuum drying, freeze-drying, or the like; it is preferable to perform a drying process in a combination of the hot air drying with the microwave drying or dielectric drying, since it can dry the whole formed body rapidly and uniformly.

In conclusion, the firing of a dried formed body is preferably made usually in the atmosphere at 1410 to 1440° C., although depending on the size of the dried formed body, when the ceramics raw material contains cordierite as the main component. When the main component of the ceramics raw material is SiC, the firing is performed in a nonoxidizing atmosphere of $N_2$, Ar, or the like, for the purpose of preventing the oxidation of SiC. When SiC is bonded by silicon nitride or the like, the firing temperature is the temperature at which the silicon nitride powder is melted, and it is preferable to fire at the temperatures from 1550 to 2000° C. When the SiC particles are bonded to each other by the recrystallization method, it is necessary to fire at a temperature of at least 1800° C. or above. Furthermore, when SiC and Si are the main components of the ceramics raw material, it is preferable to fire in a nonoxidizing atmosphere of $N_2$, Ar, or the like, at the temperatures from 1400 to 1800° C. Incidentally, the drying process and the firing process may be performed successively.

With reference to Examples, specific description of the present invention will be made below.

EXAMPLE 1

A raw material for cordierite formation comprising talc, kaoline, alumina, and aluminum hydroxide, and silica, each component being weighed so as to mimic the cordierite composition, was kneaded by use of a kneader with the prefoamed acrylonitrile copolymer resin foam (2.5 wt %) of 50 μm in the average diameter and 0.2 μm in the shell wall thickness, graphite powder (10 wt %), methyl cellulose (5 wt %), a surfactant (0.5 wt %), and water, and a puddle was obtained. A cylindrical puddle was formed by passing the puddle through a deairing pugmill. A solid circular cylinder of 25 mmφ×30 mm (length) was cut out from the cylindrical puddle, and the apparent Young's modulus of the solid circular cylinder was measured at a compression rate of 1 mm/s by use of an autograph (manufactured by Shimadzu Corporation) to be 2.3 MPa.

Then, from the cylindrical puddle formed by a deairing pugmill, a honeycomb of 300 mm in outer diameter, 300 μm in partition wall thickness, and 300 cells/in$^2$ in the number of cells was downward and vertically extrusion formed by use of a ram extrusion apparatus. Then, the obtained formed body was dried, cut to the length of 350 mm, and the both end faces were sealed alternately in a houndstooth check pattern with a paste made of the raw material for cordierite formation. The formed body thus treated was fired on a schedule of 150 h and at highest at the temperature of 1420° C. in a periodic kiln combustion furnace. Consequently, a honeycomb filter made of a good quality of cordierite fired body was obtained without occurrence of cracking in firing. The material characteristics of the fired body are such that the porosity is 68%, the average pore diameter is 35 μm, and the thermal expansion coefficient for the direction of extrusion is 0.8 ×10$^{-6}$/° C. The above described results are shown in Table 1.

EXAMPLES 2 TO 4

Plastic bodies for ceramics were prepared in a manner similar to that in Example 1, and cylindrical bodies for ceramics were formed, the apparent Young's moduli of which being varied as shown in Table 1. These bodies were extrusion formed into honeycomb structure bodies, which were fired to obtain the calined bodies, in a manner similar to that in Example 1. The porosities, average pore diameters, and thermal expansion coefficients of the fired bodies obtained are shown in Table 1.

EXAMPLE 5

A puddle was prepared in a manner similar to that in Example 1 except that the addition amount of the resin foam was 5.0 wt %, and a cylindrical puddle was formed, the apparent Young's modulus of which being varied as shown in Table 1. The body was extrusion formed into a honeycomb structure, which was fired to obtain a fired body, in a manner similar to that in Example 1. The porosity, average pore diameter, and thermal expansion coefficient of the fired body obtained are shown in Table 1.

EXAMPLE 6

A puddle was prepared in a manner similar to that in Example 1 except that the addition amount of the graphite powder was 0 wt % and that of the resin foam was 10.0 wt %, and a cylindrical puddle was formed, the apparent Young's modulus of which being varied as shown in Table 1. The body was extrusion formed into a honeycomb structure, which was fired to obtain a fired body, in a manner similar to that in Example 1. The porosity, average pore diameter, and thermal expansion coefficient of the fired body obtained are shown in Table 1.

EXAMPLE 7

A puddle was prepared in a manner similar to that in Example 1 except that the addition amount of the graphite powder was 15 wt %, that of the resin foam was 0.5 wt %, and furthermore 5 wt % of PET resin powder and 5 wt % of PMMA resin powder were added, and a cylindrical puddle was formed, the apparent Young's modulus of which being varied as shown in Table 1. The body was extrusion formed into a honeycomb structure, which was fired to obtain a fired body, in a manner similar to that in Example 1. The porosity, average pore diameter, and thermal expansion coefficient of the fired body obtained are shown in Table 1.

EXAMPLE 8

A puddle was prepared in a manner similar to that in Example 1 except that the addition amount of the resin foam was 1.0 wt %, and furthermore 5 wt % of PET resin powder and 5 wt % of PMMA resin powder were added, and a cylindrical puddle was formed, the apparent Young's modulus of which being varied as shown in Table 1. The body was extrusion formed into a honeycomb structure, which was fired to obtain a fired body, in a manner similar to that in Example 1. The porosity, average pore diameter, and thermal expansion coefficient of the fired body obtained are shown in Table 1.

EXAMPLE 9

A puddle was obtained by kneading with a kneader a ceramics raw material comprising 80 wt % of SiC powder and 20 wt % of Si powder, together with the added 8.0 wt % of hydroxypropyl methyl cellulose, 0.5 wt % of a surfactant, 2.0 wt % of a prefoamed resin foam of acrylonitrile copolymer having an average diameter of 50 μm and a shell wall thickness of 0.2 μm, and water. The puddle was formed into a cylindrical puddle by passing through a deairiang pugmill. A solid circular cylinder of 25 mmφ×30 mm (length) was cut out from the cylindrical puddle, and the apparent Young's modulus of the solid circular cylinder was measured at a compression rate of 1 mm/s by use of an autograph to be 2.2 MPa.

Then, from the cylindrical puddle formed by a deairing pugmill, a honeycomb of 60 mm (the section of 60 mm×60 mm), 300 μm in partition wall thickness, and 300 cells/in$^2$ in the number of cells was laterally extrusion formed by use of a ram extrusion apparatus. Then, the obtained formed body was dried, cut to the length of 200 mm, and both end faces were sealed alternately in a houndstooth check pattern with a paste made of 80 wt % of SiC powder and 20 wt % of Si powder. The formed body thus treated was fired using an atmospheric furnace in an oxidizing atmosphere up to 400° C. and in an argon atomosphere at 400° C. and above on a schedule of 50 h with the maximum temperature of 1450° C. Consequently, a honeycomb filter made of a good quality of Si-bonded SiC was obtained, without occurrence of cracking in firing. The material characteristics of the fired body are such that the porosity is 58%, the average pore diameter is 15 μm, and the thermal expansion coefficient for the direction of extrusion is 4.2 ×10$^{-6}$/° C.

EXAMPLE 10

A puddle was obtained by kneading with a kneader a ceramics raw material comprising 80 wt % of SiC powder with the average diameter of 10 μm and 20 wt % of SiC powder with the average diameter of 1 μm, together with the added 8.0 wt % of hydroxypropyl methyl cellulose, 0.5 wt % of a surfactant, 2.0 wt % of a prefoamed resin foam of acrylonitrile copolymer having an average diameter of 50 μm and a shell wall thickness of 0.2 μm, and water. The puddle was formed into a cylindrical puddle by passing through a deairiang pugmill. A solid circular cylinder of 25 mmφ×30 mm (length) was cut out from the cylindrical puddle, and the apparent Young's modulus of the solid circular cylinder was measured at a compression rate of 1 mm/s by use of an autograph to be 2.1 MPa.

Then, from the cylindrical puddle formed by a deairing pugmill, a honeycomb of 40 mm (the section of 40 mm×40 mm), 300 μm in partition wall thickness, and 300 cells/in$^2$ in the number of cells was laterally extrusion formed by use of a ram extrusion apparatus. Then, the obtained formed body was dried, cut to the length of 200 mm, and both end faces were sealed alternately in a houndstooth check pattern with a paste made of SiC powder. The formed body thus treated was fired using an atmospheric furnace in an oxidizing atmosphere up to 400° C. and in an argon atomosphere at 400° C. and above on a schedule of 50 h with the maximum temperature of 2200° C. Consequently, a honeycomb filter made of a good quality of SiC was obtained, without occurrence of cracking in firing. The material characteristics of the fired body are such that the porosity is 59%, the average pore diameter is 10 μm, and the thermal expansion coefficient for the direction of extrusion is $4.5 \times 10^{-6}/°$ C.

COMPARATIVE EXAMPLE 1

A raw material for cordierite formation similar to that in Example 1, with the added pore forming material comprising 25 wt % of graphite powder, 15 wt % of PET resin powder, and 20 wt % of PMMA resin powder, and with added 7 wt % of methyl cellulose, 0.7 wt % of a surfactant, and water, was kneaded by use of a kneader to obtain a puddle. Following the subsequent processes similar to those in Example 1, a honeycomb filter of cordierite quality was formed.

When the calination was performed under the calcination conditions similar to those in Example 1, cracking occurred in the filter during firing so that no perfect filter could be obtained. The material characteristics of the fired body are such that the porosity is 67%, the average pore diameter is 20 μm, and the thermal expansion coefficient for the direction of extrusion is $1.0 \times 10^{-6}/°$ C.

COMPARATIVE EXAMPLE 2

The same raw material, resin foam, binder, and the like in the same weight ratios as in Example 1, with a reduced amount of water as compared to Example 1, were kneaded, and a cylindrical puddle was formed by use of a deairing pugmill. A solid circular cylinder of 25 mmφ×30 mm (length) was cut out from the cylindrical puddle, and the apparent Young's modulus of the solid circular cylinder was measured at a compression rate of 1 mm/s by use of an autograph to be 3.2 MPa. Following the subsequent processes similar to those in Example 1, a honeycomb filter of cordierite quality was formed. No cracking occurred during firing, and the material characteristics are such that the porosity is 53%, the average pore diameter is 19 μm, and the thermal expansion coefficient for the direction of extrusion is $0.4 \times 10^{-6}/°$ C. These characteristics can be ascribed to the observation that the puddle was too hard, and the resin foam was crushed during kneading, pudding, and forming processes, resulting in a lowering of the porosity.

COMPARATIVE EXAMPLE 3

A cylindrical puddle was formed by use of a deairing pugmill, in a manner similar to that in Example 7, except that the addition amount of the resin foam was 0.3 wt %. Its apparent Young's modulus was measured in a manner similar to that in Example 1 to be 1.3 MPa. Although a honeycomb filter of cordierite quality was formed by following the subsequent processes similar to those in Example 1, no satisfactory honeycomb was obtained owing to the crushing caused by its own weight. The material characteristics of the fired body are such that the porosity is 58%, the average pore diameter is 22 μm, and the thermal expansion coefficient for the direction of extrusion is $0.6 \times 10^{-6}/°$ C.

COMPARATIVE EXAMPLE 4

Using the same raw material as that in Example 6 except that the addition amount of the resin foam was 15 wt %, kneading was performed with a kneader, but no puddle was obtained so that the forming was impossible.

COMPARATIVE EXAMPLE 5

The same raw material, resin foam, binder, and the like in the same weight ratios as in Example 9, with a reduced amount of water as compared to Example 9, were kneaded, and a cylindrical puddle was formed by use of a deairing pugmill. Its apparent Young's modulus was measured in a manner similar to that in Example 1 to be 3.5 MPa. Following the subsequent processes similar to those in Example 9, a honeycomb filter of a Si-bonded SiC quality was formed. No cracking occurred during calcination, and the material characteristics are such that the porosity is 48%, the average pore diameter is 10 μm, and the thermal expansion coefficient for the direction of extrusion is $4.3 \times 10^{-6}/°$ C. These characteristics can be ascribed to the observation that the puddle was too hard, and the resin foam was crushed during kneading, pudding, and forming processes, resulting in a lowering of the porosity.

COMPARATIVE EXAMPLE 6

The same ceramics raw material as that in Example 9, with the added pore forming material comprising 10 wt % of PET resin powder and 10 wt % of PMMA resin powder, and with added 8 wt % of hydroxypropyl methyl cellulose, 0.8 wt % of a surfactant, and water, was kneaded by use of a kneader to obtain a puddle. Its apparent Young's modulus was measured in a manner similar to that in Example 1 to be 3.6 MPa. Following the subsequent processes similar to those in Example 9, firing was made under the firing conditions similar to those in Example 9, and cracking occurred in the filter during firing so that no perfect filter was obtained. The material characteristics of the fired body are such that the porosity is 57%, the average pore diameter is 13 μm, and the thermal expansion coefficient for the direction of extrusion is $4.2 \times 10^{-6}/°$ C.

TABLE 1

Examples and Comparative Examples

| No. | Ceramics raw material | Graphite Added amount (%) | PET resin powder Added amount (%) | PMMA resin powder Added amount (%) | Resin foam Added amount (%) | Young's modulus of puddle (MPa) | Porosity (%) | Average pore diameter (μm) | Thermal expansion coefficient (×10⁻⁶/° C.) | Cracking in firing yes/no |
|---|---|---|---|---|---|---|---|---|---|---|
| Exam. 1 | cordierite formation raw material | 10 | 0 | 0 | 2.5 | 2.3 | 68 | 35 | 0.8 | no |
| Exam. 2 | cordierite formation raw material | 10 | 0 | 0 | 2.5 | 2.6 | 64 | 32 | 0.7 | no |
| Exam. 3 | cordierite formation raw material | 10 | 0 | 0 | 2.5 | 2.9 | 62 | 30 | 0.6 | no |
| Exam. 4 | cordierite formation raw material | 10 | 0 | 0 | 2.5 | 1.6 | 70 | 36 | 0.9 | no |
| Exam. 5 | cordierite formation raw material | 10 | 0 | 0 | 5.0 | 2.4 | 75 | 40 | 1.0 | no |
| Exam. 6 | cordierite formation raw material | 0 | 0 | 0 | 10.0 | 2.0 | 81 | 42 | 1.1 | no |
| Exam. 7 | cordierite formation raw material | 15 | 5 | 5 | 0.5 | 2.8 | 60 | 23 | 0.6 | no |
| Exam. 8 | cordierite formation raw material | 10 | 5 | 5 | 1.0 | 2.7 | 62 | 25 | 0.6 | no |
| Exam. 9 | SiC:80% + Si:20% raw material | 0 | 0 | 0 | 2.0 | 2.2 | 58 | 15 | 4.2 | no |
| Exam. 10 | SiC | 0 | 0 | 0 | 2.0 | 2.1 | 59 | 10 | 4.5 | no |
| Comp. Exam. 1 | cordierite formation raw material | 25 | 15 | 20 | 0 | 3.3 | 67 | 20 | 1.0 | yes |
| Comp. Exam. 2 | cordierite formation raw material | 10 | 0 | 0 | 2.5 | 3.2 | 53 | 19 | 0.4 | no |
| Comp. Exam. 3 | cordierite formation raw material | 15 | 5 | 5 | 0.3 | 1.3 | 58 | 22 | 0.6 | *1 |
| Comp. Exam. 4 | cordierite formation raw material | 0 | 0 | 0 | 15 | — | — | — | — | *2 |
| Comp. Exam. 5 | SiC:80% + Si:20% | 0 | 0 | 0 | 2.0 | 3.5 | 48 | 10 | 4.3 | no |
| Comp. Exam. 6 | SiC:80% + Si:20% | 0 | 10 | 10 | 0 | 3.6 | 57 | 13 | 4.2 | yes |

*1: No satisfactory honeycomb was obtained owing to the crushing during forming due to the own weight of the honeycomb.
*2: No forming was possible since no puddle could be prepared by kneading.

Incidentally, the average pore diameters and porosities of the honeycomb filters and the apparent Young's moduli of the bodies for ceramics in the above described Examples and Comparative Examples were measured by means of the following methods.

(1) Average Pore Diameters

The average pore diameters were measured by use of a mercury pressure porosimeter manufactured by Micromeritics, Inc.

(2) Porosities

When cordierite was used as ceramics raw material, the porosity was calculated from the total pore volume by assuming that its true specific gravity was 2.52 g/cm³. When SiC and Si were used as ceramics raw material, the porosity was calculated from the total pore volume by assuming that its true specific gravity was 3.11 g/cm³. When SiC was used as ceramics raw material, the porosity was calculated from the total pore volume by assuming that its true specific gravity was 3.20 g/cm³.

(3) Apparent Young's Moduli

As shown in FIG. 1, the displacements measured by an autograph were plotted against the loads to make a graph, and the apparent Young's modulus was obtained from the slope of the tangent at the original point.

Industrial Applicability

As described above, according to the method of manufacturing the present invention, there is achieved a remarkable effect that a ceramic structure having a high porosity can be obtained without using a large amount of flammable powder.

What is claimed is:

1. A method of manufacturing a ceramic structure, comprising:

mixing a ceramics raw material, a prefoamed resin foam, and a plasticizer to prepare a puddle;

forming the puddle into a formed body by extrusion; and subsequently firing the formed body to obtain a porous ceramic structure, wherein the puddle is formed into a solid circular cylinder of 25 mmφ×30 mm (length) by use of a vacuum pugmill, and the apparent Young's modulus of the solid circular cylinder measured at a compression rate of 1 mm/s is 1.5 MPa or above and 3.0 MPa or below.

2. The method of manufacturing a ceramic structure according to claim 1, wherein the ceramic structure is a honeycomb structure.

3. The method of manufacturing a ceramic structure according to claim 1, wherein the ceramic structure is a honeycomb filter that has a plurality of through-holes having openings on the end face of the exhaust gas inflow side and the end face of the exhaust gas outflow side, and the plurality of through-holes are plugged alternately on either of both end faces.

4. The method of manufacturing a ceramic structure according to claim 1, wherein the ceramic structure is composed of, as the main components, at least one of cordierite, silicon carbide (SiC), and silicon carbide (SiC) and metallic silicon (Si).

5. The method of manufacturing a ceramic structure according to claim 1, wherein a puddle is downward and vertically extruded.

6. The method of manufacturing a ceramic structure according to claim 1, wherein the addition amount of a resin foam is 0.5 to 10 wt %.

7. The method of manufacturing a ceramic structure according to claim 6, wherein the addition amount of a resin foam is 1 to 5 wt %.

8. The method of manufacturing a ceramic structure according to claim 7, wherein the average diameter of a resin foam is 2 to 200 μm.

9. The method of manufacturing a ceramic structure according to claim 8, wherein a shell wall thickness of a resin foam is 0.01 to 1.0 μm.

10. The method of manufacturing a ceramic structure according to claim 1, wherein the prefoamed resin foam comprises a copolymer of vinylidene chloride or a copolymer of acrylonitrile.

* * * * *